(12) United States Patent
Husnay et al.

(10) Patent No.: US 7,335,331 B1
(45) Date of Patent: Feb. 26, 2008

(54) METHOD FOR MAKING CERAMIC PLATES

(76) Inventors: Dana M. Husnay, 328 Meadow Glen Dr., Bear, DE (US) 19701; Noah A. Nichelson, 327 Sunnyside La., Townsend, DE (US) 19734

( * ) Notice: Subject to any disclaimer, the term of this patent is extended or adjusted under 35 U.S.C. 154(b) by 277 days.

(21) Appl. No.: 11/069,245

(22) Filed: Mar. 1, 2005

(51) Int. Cl.
C04B 41/45 (2006.01)
C04B 35/56 (2006.01)

(52) U.S. Cl. .................. 264/682; 264/624; 264/632

(58) Field of Classification Search ............... 264/640, 264/682, 632, 624
See application file for complete search history.

(56) References Cited

U.S. PATENT DOCUMENTS

| | | | |
|---|---|---|---|
| 3,765,300 A | 10/1973 | Taylor et al. | |
| 3,852,099 A | 12/1974 | Prochazka | 501/91 |
| 4,477,493 A | 10/1984 | Parkinson et al. | 427/228 |
| 5,008,159 A | 4/1991 | Higgins et al. | 428/614 |
| 5,019,430 A | 5/1991 | Higgins et al. | 427/430.1 |
| 5,205,970 A | 4/1993 | Brun et al. | 264/60 |
| 5,294,489 A | 3/1994 | Luthra et al. | 428/379 |
| 5,509,555 A | 4/1996 | Chiang et al. | 216/56 |
| 6,110,535 A * | 8/2000 | Rey et al. | 427/383.3 |
| 6,245,424 B1 | 6/2001 | Lau et al. | |
| 6,347,446 B1 | 2/2002 | Luthra et al. | |
| 6,355,340 B1 | 3/2002 | Singh et al. | 428/312.8 |
| 6,503,572 B1 | 1/2003 | Waggoner et al. | 427/431 |
| 6,609,452 B1 | 8/2003 | McCormick et al. | |
| 6,805,034 B1 | 10/2004 | McCormick et al. | 89/36.01 |
| 6,841,615 B2 | 1/2005 | Andersson et al. | 524/612 |
| 6,862,970 B2 | 3/2005 | Aghajanian et al. | 89/36.02 |
| 6,863,759 B2 | 3/2005 | Richmond et al. | 156/92 |
| 6,884,511 B1 | 4/2005 | Rossing et al. | 428/446 |
| 6,919,127 B2 | 7/2005 | Waggoner et al. | 428/325 |
| 6,995,103 B2 | 2/2006 | Aghajanian | 501/88 |
| 2002/0144773 A1 | 10/2002 | Richmond et al. | |
| 2003/0035901 A1 | 2/2003 | Tani | 427/431 |
| 2003/0110931 A1 | 6/2003 | Aghajanian et al. | |
| 2003/0151152 A1 | 8/2003 | Nichelson et al. | |
| 2003/0180579 A1 | 9/2003 | Waggoner et al. | 428/698 |

(Continued)

FOREIGN PATENT DOCUMENTS

EP 34329 A1 8/1981

(Continued)

*Primary Examiner*—Carlos Lopez
(74) *Attorney, Agent, or Firm*—Drinker Biddle & Reath LLP

(57) ABSTRACT

Compositions and methods of making ceramic plates are described. The compositions are water-based slurries that include filler material, one or more clay components, one or more strength or processing additives, and/or a carbon source. The filler material can include a first grade of boron carbide having a relatively large average particle size, a second grade of boron carbide having an intermediate average particle size, a third grade of boron carbide having a fine average particle size, and/or a silicon carbide having a fine average particle size. The methods of the invention involve casting and drying the slurry to make a substantially dry preform, providing a silicon loaf having a solid form for supporting one or more preforms, placing the substantially dry preform on top of the silicon loaf inside of an infiltration furnace and heating the substantially dry preform and loaf to melt silicon within the loaf and infiltrate the perform to create a ceramic plate.

8 Claims, 4 Drawing Sheets

U.S. PATENT DOCUMENTS

| | | |
|---|---|---|
| 2004/0065868 A1 | 4/2004 | Aghajanian et al. |
| 2004/0238794 A1 | 12/2004 | Karandikar et al. ........ 252/500 |
| 2005/0181209 A1 | 8/2005 | Karandikar ................. 428/408 |

FOREIGN PATENT DOCUMENTS

| | | |
|---|---|---|
| EP | 1200370 B1 | 10/2005 |
| GB | 2137974 A * | 10/1984 |
| WO | WO9001472 A1 | 2/1990 |

\* cited by examiner

METHOD FOR MAKING CERAMIC PLATES

FIELD OF THE INVENTION

The invention relates to the field of ceramic bodies. The invention is particularly well suited for making ceramic plates useful as armor or as a component of armor.

BACKGROUND OF THE INVENTION

Ceramic bodies can be used as armor in a variety of shapes and sizes for different armor applications. Such bodies, in the form of moderately sized plates, have been found to be particularly useful as components in body armor. As a component in body armor, a ceramic plate can be used in conjunction with a secondary layer of fiber, plastic or composite material, which can be bonded to the plate or otherwise positioned between the plate and the wearer in use. Known materials for use in body armor include polyesters, such as Kevlar, metallocene catalyzed polymers and various fiber reinforced plastics. The ceramic plate is intended to fragment an incoming bullet directed at the wearer and also to distribute the force of the incoming bullet to minimize blunt trauma injury. The secondary layer is intended to stop or "catch" the resultant fragments to prevent them from penetrating the wearer.

"Siliconizing" is a method of forming ceramic plates for body armor in which a preform of porous filler material, often silicon carbide, and free carbon are placed in a vacuum furnace to take up molten silicon metal from a silicon bath. During the infiltration process, silicon metal fills the interstices within the preform. Some of the silicon metal reacts with the free carbon to form reaction-formed silicon carbide ("RFSC"). As used herein, RFSC refers to silicon carbide formed in situ within the preform during or following silicon infiltration, as opposed to silicon carbide that was cast as part of the preform or introduced with the infiltrate. The unreacted silicon cools and hardens in the interstices to form a silicon matrix. Such a process is described in U.S. Pat. No. 6,609,452 to McCormick et al, which is incorporated herein by reference in its entirety.

As noted above, the filler material used in the preforms is often silicon carbide. However, it also known to use other materials. U.S. patent application Publication No. 2003/0110931, in the name of Aghajanian et al., describes the use of boron carbide as the filler material. According to Aghajanian et al, a preform was formed from 100 parts of ceramic particulate and 8 parts of fructose, which was later pyrolyzed to provide free carbon. The ceramic material was a mixture of boron carbide and silicon carbide (Example 1) or boron carbide only (Example 2).

Preforms can be produced from a slurry of filler material, such as by sedimentation casting, as described in McCormick and Aghajanian, or by pressure casting as described in U.S. patent application Publication No. 2003/0151152, in the name of Nichelson et al., which is also incorporated herein by reference in its entirety.

Previous attempts to manufacture silicon infiltrated boron carbide composites (e.g., Aghajanian, noted above, and U.S. Pat. No. 3,765,300 to Palicka) encountered problems when attempting to infiltrate preforms with silicon metal. As boron carbide is both soluble in and reactive with liquid silicon metal, over-reaction at the silicon metal/ceramic interface during infiltration can occur. If uncontrolled, this over-reaction can lead to significant material degradation and cracking at the points of infiltration.

Moreover, typical methods of providing molten silicon metal available for infiltration are prone to containment problems. For example, if the silicon metal leaks, it can cause catastrophic damage to high value components of required vacuum furnaces and result in large amounts of scrapped product due to insufficient silicon metal availability during infiltration.

SUMMARY OF THE INVENTION

The present invention relates to compositions for a preform, compositions for a silicon loaf, and methods for making ceramic plates using the preform and the silicon loaf. The compositions for the preform are water-based slurries that can include a major proportion of filler material, one or more clay components, one or more strength or processing additives, and a carbon source. The filler material can be made up of two or more grades of boron carbide, including a first grade of boron carbide having a large average particle size, a second grade of boron carbide having an intermediate average particle size, and/or a third grade of boron carbide having a fine average particle size.

The water-based slurries can be cast and dried to make a substantially dry preform.

The compositions for the silicon loaf include a major proportion of silicon, a minor proportion of one or more bonding agents, a minor proportion of one or more boron carbides, and water. The silicon can include silicon metal fragments and silicon powder. The bonding agents can be carbon black or potato starch. The boron carbide can include a first boron carbide consisting of at least, by weight, 50% of the particles that are between about 5 microns and about 20 microns. The boron carbide can also include a second boron carbide consisting of at least, by weight, 50% of the particles that are larger than about 40 microns.

According to a method of the invention, the silicon loaf, which has a solid form and adequate height, width and length for supporting one or more preforms, can be provided for infiltrating the substantially dry preform. In carrying out infiltration using a silicon loaf ("loaf infiltration"), the substantially dry preform is placed on top of the silicon loaf inside of an infiltration furnace. Heat is applied to melt silicon within the loaf and infiltrate the substantially dry preform.

BRIEF DESCRIPTION OF THE DRAWINGS

For the purpose of illustrating the invention, there is shown in the drawings a form, which is presently preferred; it being understood, that this invention is not limited to the precise arrangements and instrumentalities shown.

DETAILED DESCRIPTION OF THE DRAWINGS

Figure 1:
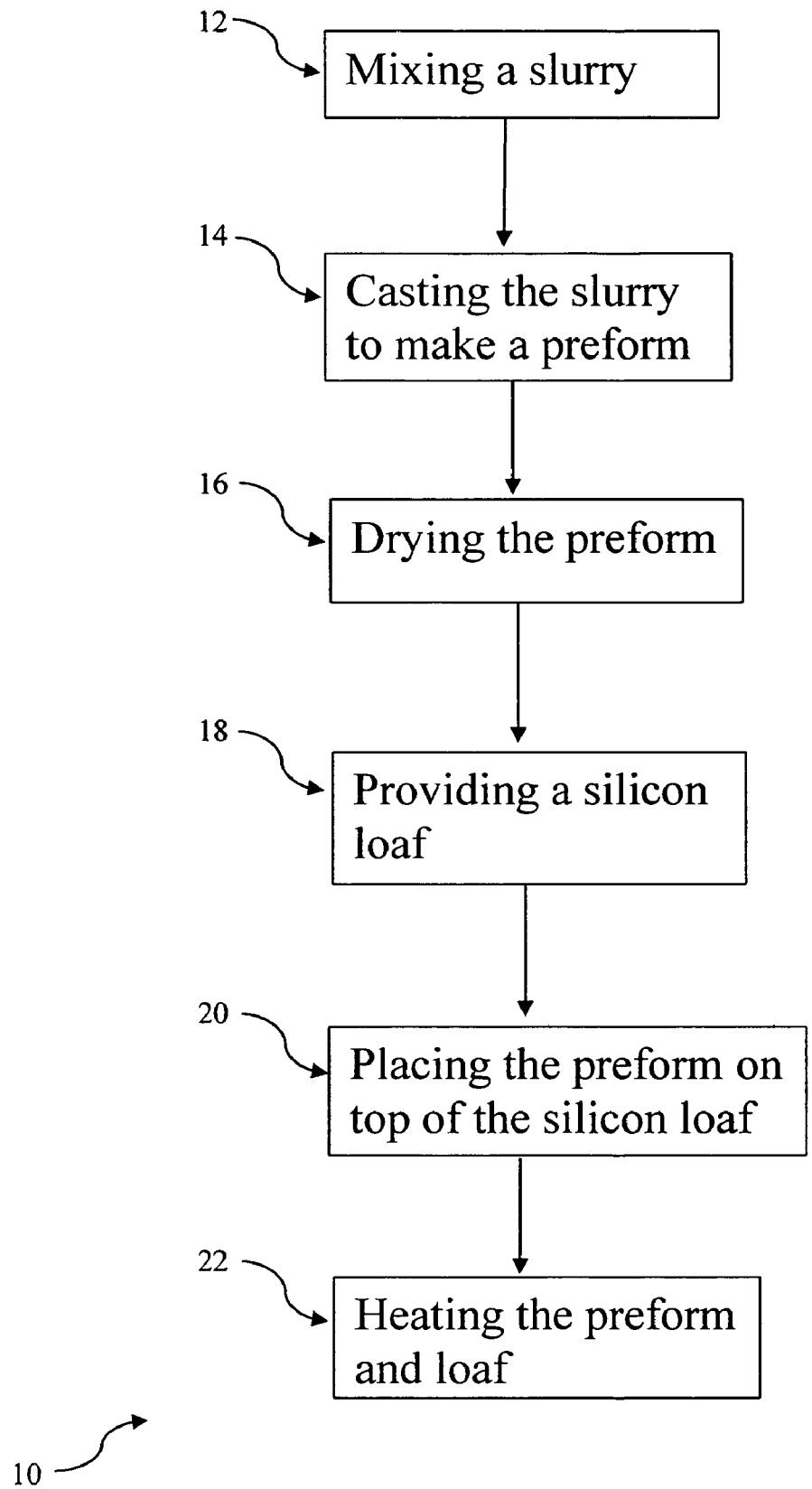
FIG. 1 is a flowchart showing a method of making ceramic plates according to the present invention.

The Figures show preferred methods, apparatus for carrying out the methods, and products produced in accordance with the present invention. As shown in FIG. 1, the methods involve the steps of forming a preform and infiltrating the preform with silicon. Processes for performing each of these steps are described below.

As shown in FIG. 1, a preform can be formed by mixing 12 an appropriate slurry composition. The slurry can be cast 14, preferably by pressure casting in a porous mold, to produce a wet preform having a general plate shape. Once formed, the wet preform can be transferred from the casting machine to a carrier plate, which, when the preform is intended for use as body armor, can have a concavity to form the wet preform into an accommodating shape for a user's chest. The wet preform can be dried 16 to drive off a majority of the water and produce a porous, substantially dry preform.

The preferred method of infiltrating the substantially dry preform is to provide 18 a silicon loaf having a solid form and adequate height, width and length for supporting one or more substantially dry preforms. The preform can then be placed 20 on top of the loaf inside of an infiltration furnace. Heating 22 the substantially dry preform and loaf melts silicon in the loaf, which infiltrates the porous substantially dry preform. Each of these steps is described in more detail below.

Preform Preparation

The slurry can be formed by mixing a major proportion of filler and a minor proportion of a carbon source with water, preferably de-ionized water. A minor proportion of clay and additional minor proportions of strength and processing additives can also be included in the slurry. As used herein to describe illustrative embodiments, the term "major proportion" means at least 50 percent by weight of a total formulation. The term "minor proportion" means no more than 10 percent by weight of a formulation.

Filler materials that can be used in preform casting include boron carbide and silicon carbide, the former being preferred. Boron carbide is commercially available in various particle sizes, which are typically described in terms of grade. The grade of boron carbide relates to the U.S. standard mesh size through which a percentage of particles cannot pass. Grade F220 boron carbide grit is reported as containing at least 65% of its particles by weight that cannot pass through a 325 mesh screen (particles of approximately 44 microns or more), at least 40% particles that cannot pass through a 270 mesh screen (particles of approximately 53 microns or more) and 0 to 15% of its particles by weight that cannot pass through a 200 mesh screen (particles of approximately 74 microns or more). Grade F500 boron carbide grit is reported as containing 50% of its particles by weight that are between about 11.8 microns and about 13.8 microns, 97% of its particles by weight that are no greater than about 25 microns, and 94% of its particles by weight that are no less than about 5.0 microns. Another grade of boron carbide is identified as 1.8 micron grit, which is reported as containing 50% of its particles by weight between about 2.0 microns and 3.0 microns.

When using boron carbide as the filler, the major proportion of boron carbide can optimally represent about 66% of the slurry by weight. Two or more different grades of boron carbide, such as those noted above, can be included in the major proportion of boron carbide. In a preferred embodiment, a grade having a relatively large average particle size, such as more than 40 microns, can make up between 25% and 50% of the total weight of the slurry. A grade of intermediate average particle size, such as between 5 microns and 40 microns, and a grade of fine particle size, such as between 1 micron and 5 microns, can each make up between 5% and 25% of the total slurry weight.

It is believed that the use of two or more grades of filler material permits smaller sized particles to occupy the interstices between the larger sized particles, ultimately resulting in a preform having filler bodies of relatively small particle size, yet highly populated with filler. To optimize this effect, it is preferred that one or more of the individual grades of boron carbide have at least 50% of its particles by weight that are between about 5 microns and about 20 microns, and also that one or more of the individual grades of boron carbide have at least 50% of its particles by weight that are between about 1 micron and about 5 microns. Use of very fine grain filler, such as the 1.8 micron boron carbide is especially preferred.

The clay component of the slurry compositions of this invention can be ball clay, bentonite, such as sodium bentonite (western bentonite) or calcium bentonite (southern bentonite) or other clays. Ball clay is made of very fine particles and organic content that, in combination with other fine particles in the slurry, promote a stable gel structure with good plastic flow characteristics. The preferred ball clay typically includes 99% by weight of particles of less than 20 microns, 73% particles of less than 1 micron and 58% particles of less than 0.5 micron. An exemplary ball clay can be composed of, by weight, 55.6% $SiO_2$, 28.6% $Al_2O_3$, 1.8% $TiO_2$, 1.0% $Fe_2O_3$, 0.1% CaO, 0.4% MgO, 1.1% $K_2O$, 0.1% $Na_2O$ and 11.4% organic material.

Bentonite, and especially sodium bentonite, can help provide good dried strength to the preforms made from the slurry. Sodium bentonite is believed to help impart dried strength by enhancing intermediate strength as the preform begins to dry, thereby limiting cracking on drying. The bentonite can be formed from: 57.0%–62.0% $SiO_2$, 18.0%–21.0% $Al_2O_3$, 2.8%–3.5% iron oxide (FeO, $Fe_2O_3$), 0.7%–1.2% CaO, 2.3%–3.2% MgO, 0.4%–0.6% $K_2O$, 2.1%–2.7% $Na_2O$ and 5.8%–16.7% organic material.

Preferably, the slurry includes minor proportions of both ball clay and sodium bentonite. A suitable ball clay is commercially available from Kentucky-Tennessee Clay Company of Nashville, Tenn., USA ("KT Clay") under the tradename Old Mine Ball Clay No. 4. Old Mine Ball Clay No. 4 is described as a fine-grained ball clay with excellent plasticity and strength, and as useful as a suspension aid in glazes. Old Mine Ball Clay No. 4 has a specific surface area of about 22.8 $m^2/g$ and has a composition where about 86% of the particles are less than 5 microns and about 43% of the particles are less than 0.5 microns in size. A suitable sodium bentonite is commercially available from American Colloid Company of Arlington Heights, Ill., USA under the tradename VOLCLAY® Dried and Crushed DC-1 Western (Sodium) Bentonite ("VOLCLAY®").

The methods of the present invention can utilize a minor amount of free carbon in the slurry, such as in the form of carbon black, which can act as a high temperature bonding agent. Suitable carbon can be obtained commercially from Cancarb Limited of Medicine Hat, Alberta, Canada under the designation Stainless Ultra Pure Carbon Black. However, if the preferred materials are not available or are otherwise not used, it is alternatively or additionally possible to use a pyrolizable carbon source, such as sucrose, in the slurry. The sucrose or other alternative carbon source can be pyrolized after making a preform to provide free carbon and impart green strength to the preform, as is known in the art.

The strength and processing additives can include one or more of green strength increasers, thickening agents, gelling agents, dispersants and lubricants. A suitable strength increaser is MORMATE® Ceramic Processing Additive, which is produced by Huntsman Performance Chemicals of Houston, Tex., USA, is commercially available from H.C. Spinks Clay Company, Inc. (Paris, Tenn., USA), and is described as a proprietary polyalkylenepolyamine mixture, provided in liquid form.

The thickening agent can be a low temperature bonding agent. For example, the thickening agent can be potato starch, which is commercially available from any of several sources. A suitable potato starch is available from A.E. Staley Manufacturing Company (Decatur, Ill., USA), under the tradename Redisol 78D.

The dispersant can be TAMOL® SN Dispersant, commercially available from Rohm & Haas Company, Philadelphia, Pa., USA. TAMOL® SN Dispersant is a sodium salt of a naphthalene-formaldehyde condensate. TAMOL® SN Dispersant is comprised of about 94% solids. Sulfated ash comprises about 32.5% of the TAMOL® SN Dispersant, while sodium sulfate comprises about 8%, iron (as $Fe_2O_3$) comprises about 0.006, and water insolubles comprise about 0.1%. The alkalinity (as $Na_2CO_3$) is about 9.4% and the pH (2% solution) is about 9.4.

The lubricant can be colloidal graphite. The colloidal graphite can act as a strength additive and as a carbon source.

It is preferred that the slurry components be added in a sequence starting with liquid components, followed by solids having the smallest particle size and ending with solids having the largest particle size. For example, for a slurry containing F220 Grit Boron Carbide, F500 Grit Boron Carbide, 1.8 micron Boron Carbide Grit, Old Mine #4 Ball Clay, VOLCLAY®, Carbon Black, Potato Starch, De-Ionized Water, MORMATE® Ceramic Processing Additive, TAMOL® SN Dispersant, and Colloidal Graphite Dispersion, the process of creating the slurry can begin by first adding the MORMATE® Ceramic Processing Additive to the de-ionized water. The colloidal graphite dispersion can then be added and these three components can be mixed for approximately 10 minutes to substantially homogenize the components. The solid components can then be added with continuous mixing, in order from first to last, dispersant, ball clay, sodium bentonite, carbon black, 1.8 micron boron carbide, F500 boron carbide and F220 boron carbide. Such a sequence can prevent clumping of material and allow for a homogeneous mixture. Other sequences can also be used; provided that the de-ionized water is always added first.

The slurry composition can be mixed in a high-speed dispersion mixer for over an hour, for example, for about 1.5 hours. The mixed slurry can be tested for various properties to help ensure that a proper mixture has been obtained. Typical properties after mixing are viscosity of 7,000 centipoise (cps), as measured by a Brookfield RVT Viscometer using a number 6 spindle, specific gravity of 1.70 grams per cubic centimeter (g/cc) and pH of 7.1.

After the slurry has been mixed, it can be stirred under vacuum, preferably at least 18 millimeters of mercury ("mm Hg"), for a period of time, such as from 7 to 9, preferably about 8 hours, in a pressure pot. This process helps to remove any air bubbles from the slurry and helps to wet the components.

The slurry can then be introduced into a pressure casting machine, such as a single- or multi-headed high pressure casting machine, to make a wet preform. A suitable single-headed casting machine is model number CSP1 76T. This and other suitable casting machines are commercially available from Elmeceram (Oradour/Vayres, France).

The above pressure casting process can be performed in a fashion similar to that described in the above-mentioned Nichelson publication. The slurry can be introduced into a porous mold having a shape similar to that of the desired preform. Introduction can be performed by injection at a pressure of approximately 600 pounds per square inch (psi) over a period of about 3 minutes. A synthetic resin mold having pores of approximately 9 microns can be used. The slurry material can be maintained in the mold under a suitable pressure for an adequate amount of time to drive a large portion of the water from the material. It has been found that maintaining the material in the mold for one minute or more under a pressure of 500 psi can drive a suitable amount of water from the material to produce a wet preform.

The wet preform can be further processed by removing it from the mold with a vacuum limpet, and placing the wet preform onto a graphite or silicon carbide carrier plate. The carrier plate can be shaped if it is desired for the final ceramic plate to have a concavity or other shape. The wet preform is adequately flexible so as to conform to the shape of the carrier plate. A concavity or curvature may be desired if the ceramic plate is to be used for body armor so that the plate conforms well to a user's body.

The wet preform on the carrier plate can be dried in a drying oven to drive off additional water and create a hardened, substantially dry preform. A conveyer-type oven, having air at temperatures of from about 300 to about 450 degrees F. flowing over the conveyer, is suitable for this purpose. Under such conditions, the preform can be dried in about an hour. The substantially dry preform can have about 25 percent porosity with pores sized from about 0.1 micron to about 3 microns.

In the alternative, if the slurry composition includes a major proportion of boron carbide (present in at least two grades), a minor proportion of deionized water, a minor proportion of deionized water, a minor proportion of a non-ionic surfactant, a minor proportion of a defoamer, and a minor proportion of a sugar, it is possible to prepare the wet preform by sedimentation casting using a vibration table and freezer, as is known in the art. The resulting frozen wet preform can be placed on a carrier plate. The frozen wet perform and the carrier plate can then be placed into a low temperature carbonization oven to create a substantially dry preform.

The substantially dry preforms, made by any of the above methods or by any other method, can be further processed by silicon infiltration. Infiltration can be done by standard methods involving a silicon bath, as described by Nichelson et al. and Aghajanian et al. Preferably, however, the substantially dry preforms are infiltrated using the silicon loaf infiltration method described below.

Loaf Preparation

As noted above, the preferred method of silicon infiltration of this invention involves placing substantially dry preforms on a silicon loaf inside of an infiltration furnace, i.e., a silicon loaf system.

Figure 2:
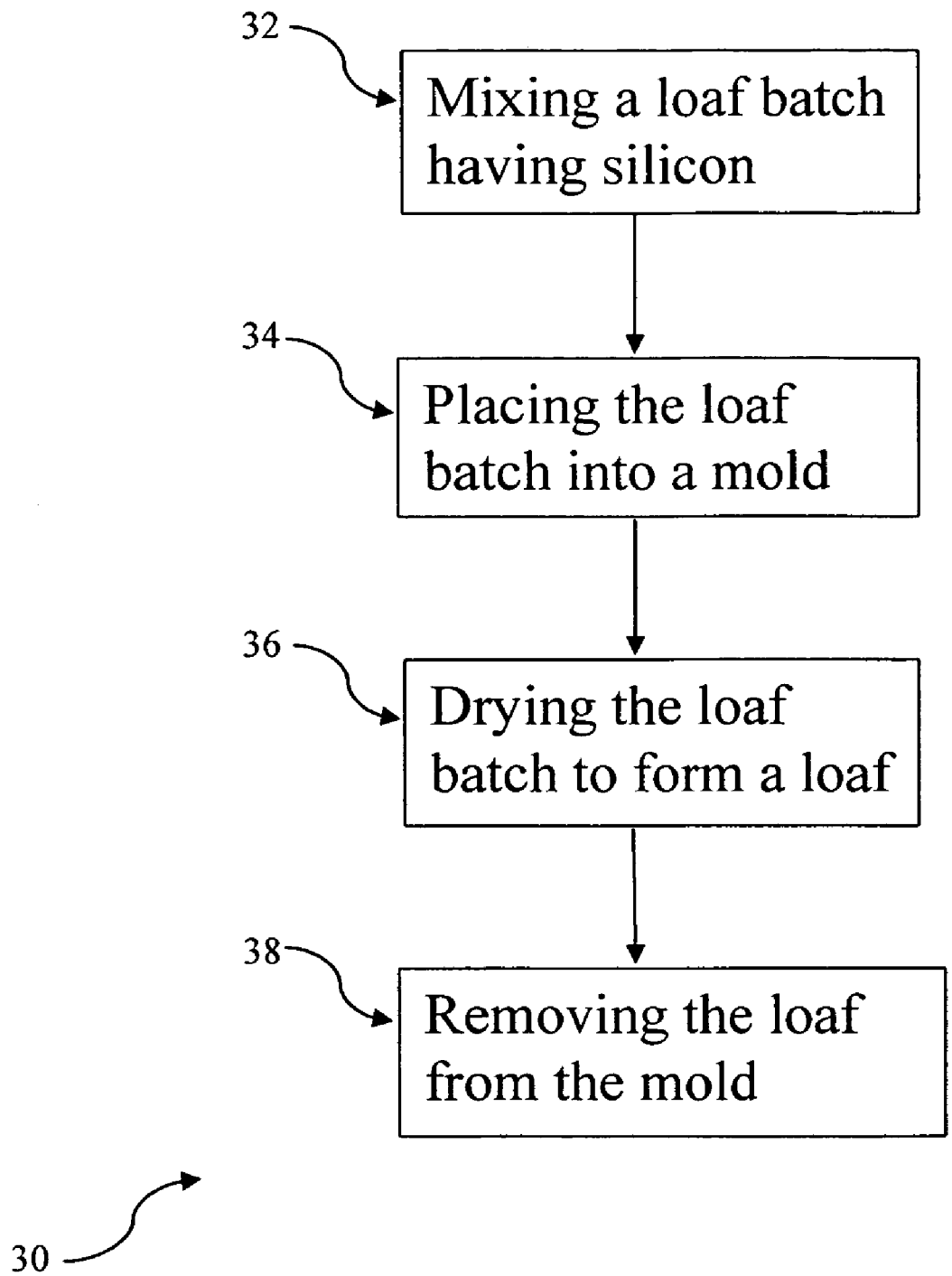
FIG. 2 is a flowchart showing a method of making a silicon loaf for infiltrating silicon into a preform according to the present invention.

The silicon loaf can have a solid form and adequate height, width and length for supporting one or more substantially dry preforms. The silicon loaf can be prepared according to the method 30 shown in FIG. 2. The method involves mixing (step 32) a loaf batch, preferably by preparing a dry mix comprising a major proportion of silicon, which can be from two or more silicon sources, and a minor proportion of one or more bonding agents. When the filler material of the preform to be infiltrated is boron carbide, as described above, it is preferred that the dry mix also include a minor proportion of boron carbide.

Suitable silicon sources for the dry mix include large silicon metal fragments, such as "Si Chunk ¼ inch and Finer", which is commercially available from Elkem Metals Company (Alloy, W. Va.), and silicon powder, which is commercially available from Globe Metallurgical, Inc. (Selma, Ala.). It is preferred that the silicon metal be relatively pure, containing less than 0.07% calcium, less than 0.5% iron and less than 0.20% aluminum.

A preferred dry mix formulation is as follows: 83% ¼-inch-and-finer silicon metal fragments, 8% silicon powder, 3% F220 grade boron carbide, 2% F500 grade boron carbide, 2% carbon black and 2% potato starch (percentages based on dry weight). In this formulation, carbon black and potato starch act as bonding agents by increasing the green strength of the loaf after the loaf drying step described below.

The dry mix formulation can be mixed in a paddle-type mixer until the components are substantially uniformly dispersed. Commercially available mixers can achieve suitable dispersion within about five minutes. The de-ionized water can be added to the dry mix after it has been dispersed or, alternatively, the de-ionized water can be added to the dry mix before mixing. The amount of water added can be the equivalent of approximately 12.7% of the dry weight of the pre-mix. The dry mix and water can be mixed for a suitable time to achieve a substantially uniformly dispersed loaf batch.

The loaf batch can be shaped by placing (step 34) the material into a rectangular mold. It is preferred that the mold be lined, with a plastic sheet for example, to facilitate removal of the loaf after drying. When making ceramic plates for use in body armor, the mold should be appropriately sized to form a loaf of adequate height, width and length for supporting one or more substantially dry preforms. Such a mold can be, for example, 14 inches wide, 18 inches long and 3 inches high. The loaf batch is dried (step 36) to form a silicon loaf. Initial drying can be accomplished by placing the filled mold into a drying oven at 110 degrees C. for about 12 hours. The loaf can then be removed (step 38) from the mold. It is preferred that the loaf be allowed to dry further, after it has been removed from the mold, for a period of rest, preferably for 24 hours, prior to use in an infiltration process. The resting period facilitates further drying by exposing the sides of the loaf that were previously juxtaposed against the mold walls.

The silicon metal loaf system detailed above effectively solves the problems associated with the methods of the prior art. By creating a flat, solid, loaf of silicon metal, molten silicon metal is evenly distributed along the entire contact area of the ceramic "preform" during reactive infiltration at over 1420° C. Additionally, the loaf is "doped" with an effective amount of $B_4C$ grit to "saturate" the silicon metal with boron carbide prior to infiltration. The preparation of the flat, solid loaf and the doping of the loaf effectively limits the amount of $B_4C$ dissolution and reaction at the interface. Silicon availability and reactivity at any given point along the interface are reduced as compared to typical "point infiltrated" or silicon metal "bath" infiltration techniques. Moreover, the additional carbon components in the loaf formulation (starch and carbon black) react with silicon metal immediately after the silicon melt begins to form a stable "sponge" like structure (composed of reaction formed silicon carbide). This sponge retains some measure of rigidity, effectively supporting the ceramic preforms while simultaneously providing liquid silicon metal for ceramic "preform" infiltration. This reaction-formed sponge effectively limits the mobility of silicon metal eliminating catastrophic silicon leaks and allowing for rapid production turnaround.

Infiltration

Figure 3:
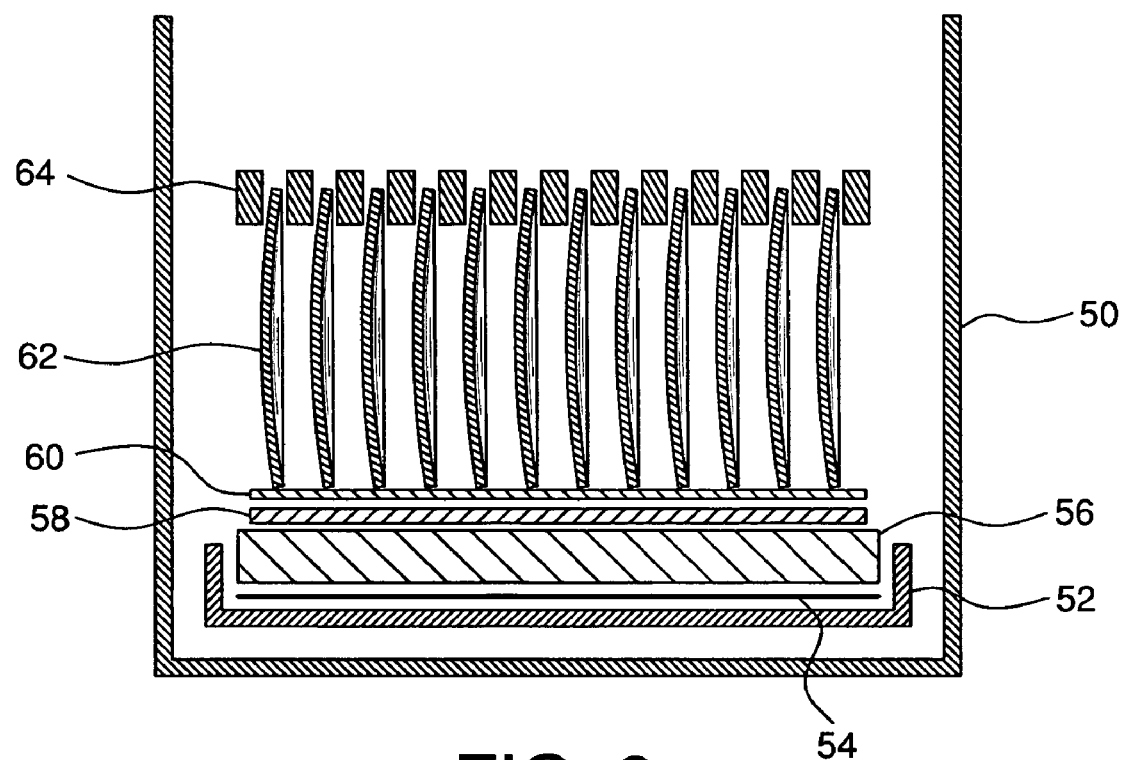
FIG. 3 is a schematic side view of an infiltration apparatus according to the present invention.

The preferred method of this invention of infiltrating a substantially dry preform with silicon metal utilizes a silicon loaf prepared according to the above-described method. Appropriate apparatus for infiltrating the substantially dry preform is schematically shown in FIG. 3. The apparatus includes an infiltration chamber 50. A graphite containment tray 52 is provided in the bottom of the chamber 50. The base of the containment tray 52 can be lined with a boron nitride coated graphfoil layer 54. The silicon loaf 56 is placed in the tray as shown.

A layer of filler grit material 58 can be placed on top of the silicon loaf 56 prior to infiltration. Where the filler material of the substantially dry preform is boron carbide, the grit layer 58 can also be boron carbide. Preferably, it is grade F220 boron carbide and is provided in an amount representing about 1.1% of the weight of the silicon loaf. A silicon transport conduit 60 can be placed on top of the grit layer 58. The transport conduit 60 can be in the form of a fibrous sheet, such as cardboard, with a plurality of thin, parallel strips of carrier material running substantially the length of the fibrous sheet. Where the filler material of the substantially dry preform is boron carbide, the carrier material can also be boron carbide, preferably F54 grade boron carbide. The strips are provided in a lengthwise configuration (running right to left in FIG. 3) so that each strip can contact a plurality of substantially dry preforms 62, which are placed on top of the transport conduit 60 in a vertical orientation transversely to the strips. In certain embodiments, each substantially dry preform can contact two or three strips. Spacers 64, such as graphite felt spacers coated with boron nitride, can be provided to maintain the vertical orientation of the substantially dry preforms. A lid (not shown) can be provided over the chamber 50.

To perform silicon infiltration (sometimes referred to as "siliconization"), the chamber 50 can be loaded into an infiltration furnace in communication with a vacuum source (i.e., a vacuum furnace). The vacuum source can be activated to reduce air pressure within the infiltration furnace to less than 1 torr. The infiltration furnace is preferably heated in steps, so that infiltration takes place during a cycle involving several temperatures over a period of several hours. Many different cycles are contemplated to be within the scope of the present invention. The cycle approach is beneficial in that it mitigates cracking of the material during both heating up and cooling down. In general, lower temperatures are used at the beginning and end of the cycle, and higher temperatures are used in the middle of the cycle.

As shown in Examples 1–4 below, the infiltration cycle can utilize 24 steps over a period of 12.25 hours. Many of the steps can be referred to as soaking or ramping steps. A soaking step is a time period in which the temperature is held relatively constant for the duration of the step. A ramping step is one in which the temperature is adjusted upwardly or downwardly during the step. During the ramping and soaking cycles, silicon metal within the loaf becomes molten. The molten silicon is carried upward through the silicon transport conduit 60 to the substantially dry preforms 62. The molten silicon continues to flow upwardly into the porous preforms to infiltrate to the substantially dry preforms. During the process, molten silicon reacts with the carbon source in the substantially dry preform to form silicon carbide (RFSC). Unreacted silicon metal can remain in the substantially dry preforms and substantially fill the pores. The weight of the substantially dry preforms can increase by more than 50% during infiltration.

The furnace can then be permitted to cool and the vacuum released. Chamber 50 can be removed from the furnace after it has cooled to 200 degrees C. or less. It is preferred to wait until the infiltrated preforms, now completed ceramic plates, cool to less than 150 degrees C. before removing them from the chamber. Once cooled, the plates can be sandblasted or otherwise processed to remove excess silicon from the plate surface.

The above-described preferred infiltration method substantially eliminates cracking both during infiltration and during cooling, thereby overcoming one of the major problems encountered in prior art infiltration methods (i.e., cracking caused by overreaction during infiltration between silicon metal and boron carbide).

Figure 4:
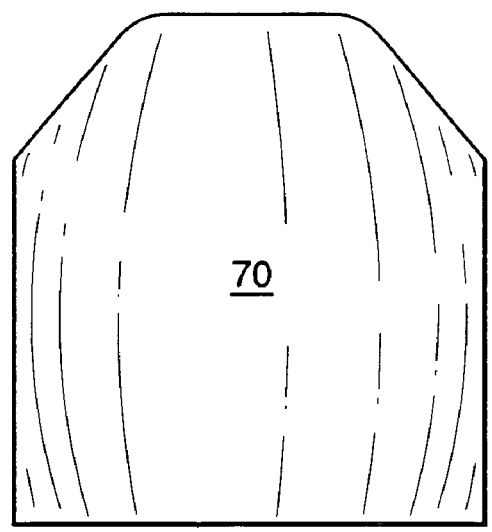
FIG. 4 is a front view of a ceramic plate produced in accordance with the methods of the present invention.

A plate 70 that can be made from the above-described preferred method is shown in FIG. 4. According to testing, such plates can have a density of 2.54–2.58 g/cc. It is estimated that a finished plate can include, by volume, about 11.14% reaction-formed silicon carbide, about 64% boron carbide and about 25% silicon metal.

Figure 5:
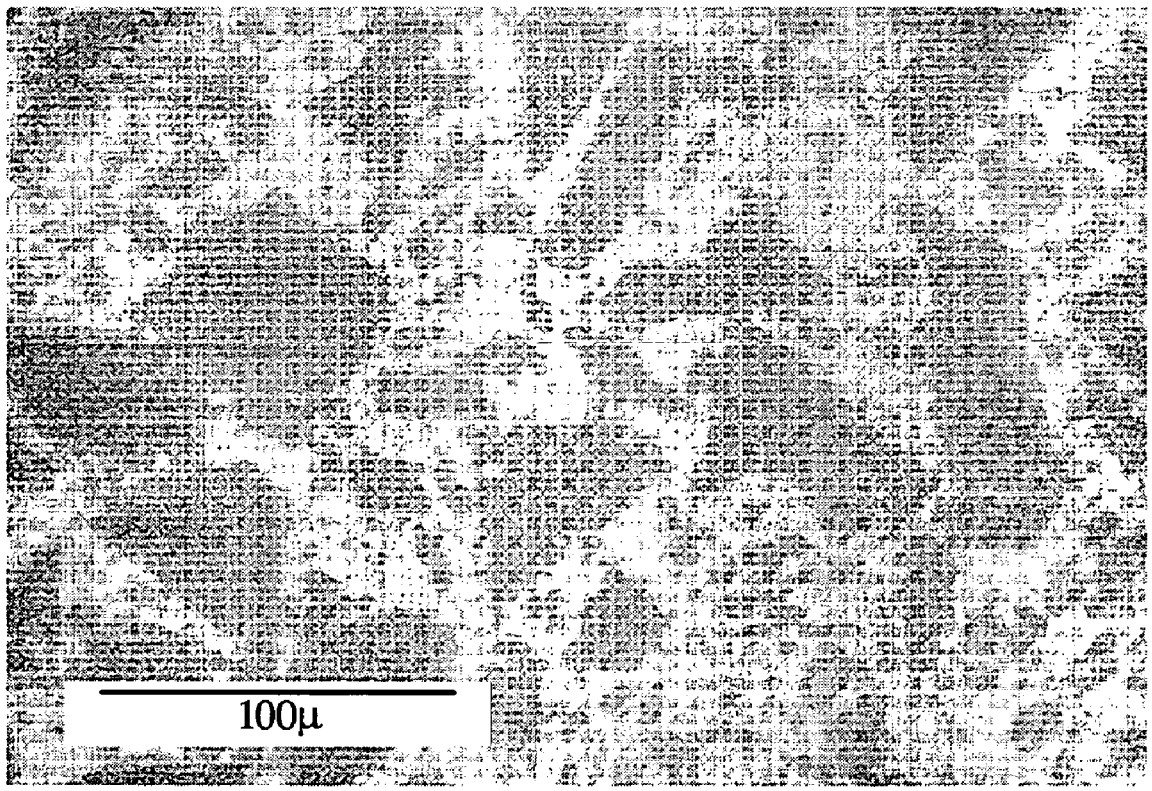
FIG. 5 is a photomicrograph of a polished cross-section of a plate produced in accordance with the methods of the present invention.

A photomicrograph of a plate, which was produced in accordance with the invention, cross-sectioned and polished, is shown in FIG. 5. The darker regions of the micrograph represent boron carbide. The grey regions indicate reaction-formed silicon carbide. The lighter regions represent silicon metal, with fine particles of boron carbide dispersed therein.

EXAMPLE 1

Preparation of a Silicon Infiltrated Ceramic Plate

A. Preparation of a Substantially Dry Preform

The following slurry composition was used to make a preform:

| Weight | Material |
| --- | --- |
| 15500 g | F220 Grit Boron Carbide |
| 5600 g | F500 Grit Boron Carbide |
| 5600 g | 1.8 micron Boron Carbide Grit |
| 474 g | Old Mine Ball Clay #4 |
| 82 g | VOLCLAY ® |
| 1295 g | Carbon Black |
| 18 g | Potato Starch |
| 10300 g | De-Ionized Water |
| 101 g | MORMATE ® Ceramic Processing Additive |
| 34 g | TAMOL ® SN Dispersant |
| 1000 g | Colloidal Graphite Dispersion |

The above components were added to a high-speed dispersion mixer, to prepare a slurry composition, starting with liquid components, followed by solids having the smallest particle size and ending with solids having the largest particle size. More specifically, the components were mixed by first adding colloidal graphite and MORMATE® Ceramic Processing Additive to the de-ionized water. These components were mixed for approximately 10 minutes. The solid components were then added while the components were continuously mixed, in order from first to last, dispersant, ball clay, sodium bentonite, carbon black, 1.8 micron boron carbide, F500 boron carbide, F220 boron carbide, and potato starch.

The slurry composition was mixed in the high-speed dispersion mixer for about 90 minutes. The mixed slurry was tested as follows: the viscosity of the slurry was 5,000 centipoise (cps), as measured by a Brookfield RVT Viscometer using a number 6 spindle, the specific gravity of the slurry was 1.74 grams per cubic centimeter (g/cc), and the pH of the slurry was 7.2.

The slurry was then continuously mixed in a closed vessel for 8 hours under vacuum of at least 18 mm Hg. The slurry was then loaded into an industrial pressure cast apparatus available from Elmeceram (Oradour-Vayres, France). Approximately 1350 g of the slurry was introduced into a shaped porous resin mold with average pore size of approximately 9 microns. The introduced material was held at a pressure of approximately 550 pounds per square inch (psi) for 1 minute. The pressure was removed from the slurry, and the mold opened.

A "cast shape" was retained in mold. Cast shape as used herein refers to a ceramic composite body formed prior to infiltration. At this point in the process, cast shape refers more specifically to the article cast using the pressure casting technique. Again at this point, the cast shape was soft and malleable. It was made up of approximately 16% water (by weight), with the remainder being made up of the slurry components.

The cast shape was subsequently "removed" from the mold and placed on a graphite carrier plate. The carrier plate had a torso type geometry similar in design to that of body armor for use on a human chest. The carrier plate, with cast shape in place, was placed in drying oven for a total of 60 minutes at 350° C. therein creating a substantially dry preform. The substantially dry preform had a measured porosity of approximately 21% with an average pore size of less than 1 micron and a weight of approximately 800 grams. The shape of the substantially dry preform closely matched the shape of the carrier plate (i.e., it had a torso type geometry).

B. Preparation of Silicon Loaf

The silicon loaf was prepared from the following formulation:

| Weight | Material |
| --- | --- |
| 4980 g | ¼-inch and finer Silicon Metal |
| 480 g | Si Powder 200 mesh |
| 120 g | F500 B$_4$C Grit |
| 180 g | F220 B$_4$C Grit |
| 120 g | Carbon Black |
| 120 g | Potato Starch |
| 762 g | De-Ionized Water |

The materials above were mixed for ten minutes in a commercially available paddle mixer to create a paste. The paste was placed into a rectangular shaped drying pan with dimensions of 12 inches by 18 inches by 3 inches. The paste was dried in the pan for 24 hours at 100° C. to create a dried loaf. The dried loaf was removed from the drying pan and allowed to continue drying for an additional 48 hours at 100° C. The dried loaf material was subsequently placed in a graphite "retort" (a graphite box approximately 20 inches by 20 inches by 24 inches) and covered with an evenly distributed layer of 80 grams of F220 $B_4C$ grit. A corrugated sheet of cardboard was placed on top of said $B_4C$ grit, and 8 lines of F54 $B_4C$ grit were glued to the top surface of said cardboard to create a loaf assembly. A boron carbide-containing ceramic preform prepared by the process detailed in Example 1.A was placed on the loaf assembly such that the loaf assembly to ceramic weight ratio was approximately 0.9. Infiltration was then performed as detailed below.

C. Infiltration

Infiltration of the substantially dry preform prepared in Example 1.A was performed in the following manner. The substantially dry preform was placed in contact with the silicon loaf prepared in Example 1.B. The substantially dry preform and loaf were placed inside of a sealed vacuum furnace, which is commercially available from Centorr Vacuum Industries.

The substantially dry preform and the loaf were heated in the ramping/soaking manner described in the table below, which shows the cycle of ramping steps ("ramp") and soaking steps ("soak"). The ramp rate for ramping steps is given in terms of change in degrees C. per minute ("C/min"). The column entitled "Final Temp C" indicates the temperature of the furnace at the end of the step.

| Segment | Type | Ramp Rate C/min | Total Ramp Time Minutes | Final Temp C. | Soak Time Minutes |
|---|---|---|---|---|---|
| 1 | Soak | 0 | | 20 | 2 |
| 2 | Ramp | 5 | 90 | 450 | |
| 3 | Soak | 0 | 0 | 450 | 20 |
| 4 | Ramp | 5 | 180 | 1350 | |
| 5 | Soak | 0 | 0 | 1350 | 30 |
| 6 | Ramp | 2.7 | 50 | 1485 | |
| 7 | Soak | 0 | 0 | 1485 | 30 |
| 8 | Ramp | 1.2 | 38 | 1530 | |
| 9 | Soak | 0 | 0 | 1530 | 40 |
| 10 | Ramp | −1 | 60 | 1470 | 0 |
| 11 | Ramp | −2.25 | 22 | 1420 | |
| 12 | Soak | 0 | 0 | 1420 | 15 |
| 13 | Ramp | −2.25 | 4.5 | 1410 | |
| 14 | Soak | 0 | 0 | 1410 | 10 |
| 15 | Ramp | −2.25 | 6.7 | 1395 | |
| 16 | Soak | 0 | 0 | 1395 | 10 |
| 17 | Ramp | −2.25 | 8.9 | 1375 | |
| 18 | Soak | 0 | 0 | 1375 | 10 |
| 19 | Ramp | −2.25 | 6.7 | 1360 | |
| 20 | Soak | 0 | 0 | 1360 | 10 |
| 21 | Ramp | −2.25 | 26.7 | 1300 | |
| 22 | Soak | 0 | 0 | 1300 | 15 |
| 23 | Ramp | −2.25 | 44.4 | 1200 | |
| 24 | Ramp | −5 | 30 | 1050 | |

During the heating period, silicon from the loaf was melted and reactively infiltrated the preform via capillary action. After cooling down, the "infiltrated" preform (i.e., the ceramic plate of the invention) was removed from vacuum furnace. The ceramic plate was sand blasted to remove excess silicon metal.

D. Post-Infiltration

The final density of the ceramic plate of the invention was 2.56 grams per cubic centimeter (g/cc).

After infiltration, the loaf assembly was removed from furnace. There was no evidence of "over-reaction" at the loaf/ceramic interface.

The loaf was removed from the graphite retort for disposal, minimizing process downtime. The loaf lost approximately 65% of its starting weight during infiltration.

EXAMPLE 2

Preparation of a Silicon Infiltrated Ceramic Plate

A. Preparation of a Substantially Dry Preform

The following slurry composition was used to make a preform:

| Weight | Material |
|---|---|
| 15636 g | F220 Grit Boron Carbide |
| 11211 g | 1.8 micron Boron Carbide Grit |
| 480 g | Old Mine Ball Clay #4 |
| 100 g | VOLCLAY ® |
| 1299 g | Carbon Black |
| 20 g | Potato Starch |
| 10817 g | De-Ionized Water |
| 100 g | MORMATE ® Ceramic Processing Additive |
| 34 g | TAMOL ® SN Dispersant |
| 983 g | Colloidal Graphite Dispersion |

The above components were added to a high-speed dispersion mixer, to prepare a slurry composition, starting with liquid components, followed by solids having the smallest particle size and ending with solids having the largest particle size. More specifically, the components were mixed by first adding colloidal graphite and MORMATE® Ceramic Processing Additive to the de-ionized water. These components were mixed for approximately 10 minutes. The solid components were then added while the components were continuously mixed, in order from first to last, dispersant, ball clay, sodium bentonite, carbon black, 1.8 micron boron carbide, F220 boron carbide, and potato starch.

The slurry composition was mixed in the high-speed dispersion mixer for about 90 minutes. The mixed slurry was tested as follows: the viscosity of the slurry was 7,700 centipoise (cps), as measured by a Brookfield RVT Viscometer using a number 6 spindle, the specific gravity of the slurry was 1.64 grams per cubic centimeter (g/cc), and the pH of the slurry was 6.9.

The slurry was then continuously mixed in a closed vessel for 8 hours under vacuum of at least 18 mm Hg. The slurry was then loaded into an industrial pressure cast apparatus available from Elmeceram (Oradour-Vayres, France). Approximately 1350 g of the slurry was introduced into a shaped porous resin mold with average pore size of approximately 9 microns. The introduced material was held at a pressure of approximately 550 pounds per square inch (psi) for 1 minute. The pressure was removed from the slurry, and the mold opened.

A "cast shape" was retained in mold. Cast shape as used herein refers to a ceramic composite body formed prior to infiltration. At this point in the process, cast shape refers more specifically to the article cast using the pressure casting technique. Again at this point, the cast shape was soft and malleable. It was made up of approximately 16% water (by weight), with the remainder being made up of the slurry components.

The cast shape was subsequently "removed" from the mold and placed on a graphite carrier plate. The carrier plate had a torso type geometry similar in design to that of body armor for use on a human chest. The carrier plate, with cast shape in place, was placed in drying oven for a total of 60 minutes at 350° C. therein creating a substantially dry preform. The substantially dry preform had a weight of approximately 830 grams. The shape of the substantially dry preform closely matched the shape of the carrier plate (i.e., it had a torso type geometry).

B. Preparation of Silicon Loaf

The silicon loaf was prepared from the following formulation:

| Weight | Material |
| --- | --- |
| 4980 g | ¼-inch and finer Silicon Metal |
| 480 g | Si Powder 200 mesh |
| 120 g | F500 B$_4$C Grit |
| 180 g | F220 B$_4$C Grit |
| 120 g | Carbon Black |
| 120 g | Potato Starch |
| 762 g | De-Ionized Water |

The materials above were mixed for ten minutes in a commercially available paddle mixer to create a paste. The paste was placed into a rectangular shaped drying pan with dimensions of 12 inches by 18 inches by 3 inches. The paste was dried in the pan for 24 hours at 100° C. to create a dried loaf. The dried loaf was removed from the drying pan and allowed to continue drying for an additional 48 hours at 100° C. The dried loaf material was subsequently placed in a graphite "retort" (a graphite box approximately 20 inches by 20 inches by 24 inches) and covered with an evenly distributed layer of 80 grams of F220 B$_4$C grit. A corrugated sheet of cardboard was placed on top of said B$_4$C grit, and 8 lines of F54 B$_4$C grit were glued to the top surface of said cardboard to create a loaf assembly. A boron carbide-containing ceramic preform prepared by the process detailed in Example 2.A was placed on the loaf assembly such that the loaf assembly to ceramic weight ratio was approximately 0.9. Infiltration was then performed as detailed below.

C. Infiltration

Infiltration of the substantially dry preform prepared in Example 2.A was performed in the following manner. The substantially dry preform was placed in contact with the silicon loaf prepared in Example 2.B. The substantially dry preform and loaf were placed inside of a sealed vacuum furnace, which is commercially available from Centorr Vacuum Industries.

The substantially dry preform and the loaf were heated in the ramping/soaking manner described in Table A below, which shows the cycle of ramping steps ("ramp") and soaking steps ("soak"). The ramp rate for ramping steps is given in terms of change in degrees C. per minute ("C/min"). The column entitled "Final Temp C" indicates the temperature of the furnace at the end of the step.

| Segment | Type | Ramp Rate C/min | Total Ramp Time Minutes | Final Temp C. | Soak Time Minutes |
| --- | --- | --- | --- | --- | --- |
| 1 | Soak | 0 | | 20 | 2 |
| 2 | Ramp | 5 | 90 | 450 | |
| 3 | Soak | 0 | 0 | 450 | 20 |
| 4 | Ramp | 5 | 180 | 1350 | |
| 5 | Soak | 0 | 0 | 1350 | 30 |
| 6 | Ramp | 2.7 | 50 | 1485 | |
| 7 | Soak | 0 | 0 | 1485 | 30 |
| 8 | Ramp | 1.2 | 38 | 1530 | |
| 9 | Soak | 0 | 0 | 1530 | 40 |

-continued

| Segment | Type | Ramp Rate C/min | Total Ramp Time Minutes | Final Temp C. | Soak Time Minutes |
| --- | --- | --- | --- | --- | --- |
| 10 | Ramp | −1 | 60 | 1470 | 0 |
| 11 | Ramp | −2.25 | 22 | 1420 | |
| 12 | Soak | 0 | 0 | 1420 | 15 |
| 13 | Ramp | −2.25 | 4.5 | 1410 | |
| 14 | Soak | 0 | 0 | 1410 | 10 |
| 15 | Ramp | −2.25 | 6.7 | 1395 | |
| 16 | Soak | 0 | 0 | 1395 | 10 |
| 17 | Ramp | −2.25 | 8.9 | 1375 | |
| 18 | Soak | 0 | 0 | 1375 | 10 |
| 19 | Ramp | −2.25 | 6.7 | 1360 | |
| 20 | Soak | 0 | 0 | 1360 | 10 |
| 21 | Ramp | −2.25 | 26.7 | 1300 | |
| 22 | Soak | 0 | 0 | 1300 | 15 |
| 23 | Ramp | −2.25 | 44.4 | 1200 | |
| 24 | Ramp | −5 | 30 | 1050 | |

During the heating period, silicon from the loaf was melted and reactively infiltrated the preform via capillary action. After cooling down, the "infiltrated" preform (i.e., the ceramic plate of the invention) was removed from vacuum furnace. The ceramic plant was sand blasted to remove excess silicon metal.

D. Post-Infiltration

The final density of the ceramic plate of the invention was 2.57 g/cc.

EXAMPLE 3

Preparation of a Silicon Infiltrated Ceramic Plate

A. Preparation of a Substantially Dry Preform

The following slurry composition was used to make a preform:

| Weight | Material |
| --- | --- |
| 21664 g | F220 Grit Boron Carbide |
| 7767 g | F500 Grit Boron Carbide |
| 7767 g | 1.8 micron Silicon Carbide ("J3000" from GrayStar LLC) |
| 600 g | Old Mine Ball Clay #4 |
| 125 g | VOLCLAY ® |
| 1800 g | Carbon Black |
| 55 g | Potato Starch |
| 9538 g | De-Ionized Water |
| 125 g | MORMATE ® Ceramic Processing Additive |
| 48 g | TAMOL ® SN Dispersant |
| 1363 g | Colloidal Graphite Dispersion |

The above components were added to a high-speed dispersion mixer, to prepare a slurry composition, starting with liquid components, followed by solids having the smallest particle size and ending with solids having the largest particle size. More specifically, the components were mixed by first adding colloidal graphite and MORMATE® Ceramic Processing Additive to the de-ionized water. These components were mixed for approximately 10 minutes. The solid components were then added while the components were continuously mixed, in order from first to last, dispersant, ball clay, sodium bentonite, carbon black, 1.8 micron boron carbide, F500 boron carbide, F220 boron carbide, and potato starch.

The slurry composition was mixed in the high-speed dispersion mixer for about 90 minutes. The mixed slurry was tested as follows: the viscosity of the slurry was 2,000 centipoise (cps), as measured by a Brookfield RVT Viscometer using a number 6 spindle, the specific gravity of the slurry was 1.87 grams per cubic centimeter (g/cc), and the pH of the slurry was 7.1.

The slurry was then continuously mixed in a closed vessel for 8 hours under vacuum of at least 18 mm Hg. The slurry was then loaded into an industrial pressure cast apparatus available from Elmeceram (Oradour-Vayres, France). Approximately 1350 g of the slurry was introduced into a shaped porous resin mold with average pore size of approximately 9 microns. The introduced material was held at a pressure of approximately 550 pounds per square inch (psi) for 1 minute. The pressure was removed from the slurry, and the mold opened.

A "cast shape" was retained in mold. Cast shape as used herein refers to a ceramic composite body formed prior to infiltration. At this point in the process, cast shape refers more specifically to the article cast using the pressure casting technique. Again at this point, the cast shape was soft and malleable. It was made up of approximately 16% water (by weight), with the remainder being made up of the slurry components.

The cast shape was subsequently "removed" from the mold and placed on a graphite carrier plate. The carrier plate had a torso type geometry similar in design to that of body armor for use on a human chest. The carrier plate, with cast shape in place, was placed in drying oven for a total of 60 minutes at 350° C. therein creating a substantially dry preform. The substantially dry preform had a weight of approximately 857 grams. The shape of the substantially dry preform closely matched the shape of the carrier plate (i.e., it had a torso type geometry).

B. Preparation of Silicon Loaf

The silicon loaf was prepared from the following formulation:

| Weight | Material |
|---|---|
| 4980 g | ¼-inch and finer Silicon Metal |
| 480 g | Si Powder 200 mesh |
| 120 g | F500 $B_4C$ Grit |
| 180 g | F220 $B_4C$ Grit |
| 120 g | Carbon Black |
| 120 g | Potato Starch |
| 762 g | De-Ionized Water |

The materials above were mixed for ten minutes in a commercially available paddle mixer to create a paste. The paste was placed into a rectangular shaped drying pan with dimensions of 12 inches by 18 inches by 3 inches. The paste was dried in the pan for 24 hours at 100° C. to create a dried loaf. The dried loaf was removed from the drying pan and allowed to continue drying for an additional 48 hours at 100° C. The dried loaf material was subsequently placed in a graphite "retort" (a graphite box approximately 20 inches by 20 inches by 24 inches) and covered with an evenly distributed layer of 80 grams of F220 $B_4C$ grit. A corrugated sheet of cardboard was placed on top of said $B_4C$ grit, and 8 lines of F54 $B_4C$ grit were glued to the top surface of said cardboard to create a loaf assembly. A boron carbide-containing ceramic preform prepared by the process detailed in Example 3.A was placed on the loaf assembly such that the loaf assembly to ceramic weight ratio was approximately 0.9. Infiltration was then performed as detailed below.

C. Infiltration

Infiltration of the substantially dry preform prepared in Example 3.A was performed in the following manner. The substantially dry preform was placed in contact with the silicon metal loaf prepared in Example 3.B. The substantially dry preform and loaf were placed inside of a sealed vacuum furnace, which is commercially available from Centorr Vacuum Industries.

The substantially dry preform and the loaf were heated in the ramping/soaking manner described in the table below, which shows the cycle of ramping steps ("ramp") and soaking steps ("soak"). The ramp rate for ramping steps is given in terms of change in degrees C. per minute ("C/min"). The column entitled "Final Temp C" indicates the temperature of the furnace at the end of the step.

| Segment | Type | Ramp Rate C/min | Total Ramp Time Minutes | Final Temp C. | Soak Time Minutes |
|---|---|---|---|---|---|
| 1 | Soak | 0 | | 20 | 2 |
| 2 | Ramp | 5 | 90 | 450 | |
| 3 | Soak | 0 | 0 | 450 | 20 |
| 4 | Ramp | 5 | 180 | 1350 | |
| 5 | Soak | 0 | 0 | 1350 | 30 |
| 6 | Ramp | 2.7 | 50 | 1485 | |
| 7 | Soak | 0 | 0 | 1485 | 30 |
| 8 | Ramp | 1.2 | 38 | 1530 | |
| 9 | Soak | 0 | 0 | 1530 | 40 |
| 10 | Ramp | −1 | 60 | 1470 | 0 |
| 11 | Ramp | −2.25 | 22 | 1420 | |
| 12 | Soak | 0 | 0 | 1420 | 15 |
| 13 | Ramp | −2.25 | 4.5 | 1410 | |
| 14 | Soak | 0 | 0 | 1410 | 10 |
| 15 | Ramp | −2.25 | 6.7 | 1395 | |
| 16 | Soak | 0 | 0 | 1395 | 10 |
| 17 | Ramp | −2.25 | 8.9 | 1375 | |
| 18 | Soak | 0 | 0 | 1375 | 10 |
| 19 | Ramp | −2.25 | 6.7 | 1360 | |
| 20 | Soak | 0 | 0 | 1360 | 10 |
| 21 | Ramp | −2.25 | 26.7 | 1300 | |
| 22 | Soak | 0 | 0 | 1300 | 15 |
| 23 | Ramp | −2.25 | 44.4 | 1200 | |
| 24 | Ramp | −5 | 30 | 1050 | |

During the heating period, silicon from the loaf was melted and reactively infiltrated the preform via capillary action. After cooling down, the "infiltrated" preform (i.e., the ceramic plate of the invention) was removed from vacuum furnace. The ceramic plate was sand blasted to remove excess silicon metal.

D. Post-Infiltration

The final density of the ceramic plate of the invention was 2.65 g/cc.

EXAMPLE 4

Preparation of a Silicon Infiltrated Ceramic Plate

A. Preparation of a Substantially Dry Preform

The following slurry composition was used to make a preform:

| Weight | Material |
| --- | --- |
| 15500 g | F220 Grit Boron Carbide |
| 5600 g | F500 Grit Boron Carbide |
| 5606 g | 1.8 micron Boron Carbide Grit |
| 474 g | Old Mine Ball Clay #4 |
| 82 g | VOLCLAY ® |
| 1295 g | Carbon Black |
| 18 g | Potato Starch |
| 10300 g | De-Ionized Water |
| 101 g | MORMATE ® Ceramic Processing Additive |
| 34 g | TAMOL ® SN Dispersant |
| 1000 g | Colloidal Graphite Dispersion |

The above components were added to a high-speed dispersion mixer, to prepare a slurry composition, in a sequence order starting with liquid components, followed by solids having the smallest particle size and ending with solids having the largest particle size. More specifically, the components were mixed by first adding colloidal graphite and MORMATE® Ceramic Processing Additive to the de-ionized water. These components were mixed for approximately 10 minutes. The solid components were then added while the components were continuously mixed, in order from first to last, dispersant, ball clay, sodium bentonite, carbon black, 1.8 micron boron carbide, F500 boron carbide, F220 boron carbide, and potato starch.

The slurry composition was mixed in the high-speed dispersion mixer for about 90 minutes. The mixed slurry was tested as follows: the viscosity of the slurry was 5,000 centipoise (cps), as measured by a Brookfield RVT Viscometer using a number 6 spindle, the specific gravity of the slurry was 1.74 grams per cubic centimeter (g/cc), and the pH of the slurry was 7.2.

The slurry was then continuously mixed in a closed vessel for 8 hours under vacuum of at least 18 mm Hg. The slurry was then loaded into an industrial pressure cast apparatus available from Elmeceram (Oradour-Vayres, France). Approximately 1350 g of the slurry was introduced into a shaped porous resin mold with average pore size of approximately 9 microns. The introduced material was held at a pressure of approximately 550 pounds per square inch (psi) for 1 minute. The pressure was removed from the slurry, and the mold opened.

A "cast shape" was retained in mold. Cast shape as used herein refers to a ceramic composite body formed prior to infiltration. At this point in the process, cast shape refers more specifically to the article cast using the pressure casting technique. Again at this point, the cast shape was soft and malleable. It was made up of approximately 16% water (by weight), with the remainder being made up of the slurry components.

The cast shape was subsequently "removed" from the mold and placed on a graphite carrier plate. The carrier plate had a torso type geometry similar in design to that of body armor for use on a human chest. The carrier plate, with cast shape in place, was placed in drying oven for a total of 60 minutes at 350° C. therein creating a substantially dry preform. The substantially dry preform had a measured porosity of approximately 21% with an average pore size of less than 1 micron and a weight of approximately 800 grams. The shape of the substantially dry preform closely matched the shape of the carrier plate (i.e., it had a torso type geometry).

B. Preparation of Silicon Loaf

The silicon loaf was prepared from the following formulation:

| Weight | Material |
| --- | --- |
| 4860 g | ½-inch and finer Silicon Metal |
| 480 g | Si Powder 200 mesh |
| 120 g | F500 $B_4C$ Grit |
| 180 g | F220 $B_4C$ Grit |
| 240 g | Carbon Black |
| 120 g | Potato Starch |
| 762 g | De-Ionized Water |

The materials above were mixed for ten minutes in a commercially available paddle mixer to create a paste. The paste was placed into a rectangular shaped drying pan with dimensions of 12 inches by 18 inches by 3 inches. The paste was dried in the pan for 24 hours at 100° C. to create a dried loaf. The dried loaf was removed from the drying pan and allowed to continue drying for an additional 48 hours at 100° C. The dried loaf material was subsequently placed in a graphite "retort" (a graphite box approximately 20 inches by 20 inches by 24 inches) and covered with an evenly distributed layer of 80 grams of F220 $B_4C$ grit. A corrugated sheet of cardboard was placed on top of said $B_4C$ grit, and 8 lines of F54 $B_4C$ grit were glued to the top surface of said cardboard to create a loaf assembly. A boron carbide-containing ceramic preform prepared by the process detailed in Example 4.A was placed on the loaf assembly such that the loaf assembly to ceramic weight ratio was approximately 0.9. Infiltration was then performed as detailed below.

C. Infiltration

Infiltration of the substantially dry preform as prepared in Example 4.A was performed in the following manner. The substantially dry preform was placed in contact with the silicon loaf as prepared in Example 4.B. The substantially dry preform and loaf were placed inside of a sealed vacuum furnace, which is commercially available from Centorr Vacuum Industries.

The substantially dry preform and the loaf were heated in the ramping/soaking manner described in the table below, which shows the cycle of ramping steps ("ramp") and soaking steps ("soak"). The ramp rate for ramping steps is given in terms of change in degrees C. per minute ("C/min"). The column entitled "Final Temp C" indicates the temperature of the furnace at the end of the step.

| Segment | Type | Ramp Rate C/min | Total Ramp Time Minutes | Final Temp C. | Soak Time Minutes |
| --- | --- | --- | --- | --- | --- |
| 1 | Soak | 0 | | 20 | 2 |
| 2 | Ramp | 5 | 90 | 450 | |
| 3 | Soak | 0 | 0 | 450 | 20 |
| 4 | Ramp | 5 | 180 | 1350 | |
| 5 | Soak | 0 | 0 | 1350 | 30 |
| 6 | Ramp | 2.7 | 50 | 1485 | |
| 7 | Soak | 0 | 0 | 1485 | 30 |
| 8 | Ramp | 1.2 | 38 | 1530 | |
| 9 | Soak | 0 | 0 | 1530 | 40 |
| 10 | Ramp | −1 | 60 | 1470 | 0 |
| 11 | Ramp | −2.25 | 22 | 1420 | |
| 12 | Soak | 0 | 0 | 1420 | 15 |
| 13 | Ramp | −2.25 | 4.5 | 1410 | |
| 14 | Soak | 0 | 0 | 1410 | 10 |
| 15 | Ramp | −2.25 | 6.7 | 1395 | |

-continued

| Segment | Type | Ramp Rate C/min | Total Ramp Time Minutes | Final Temp C. | Soak Time Minutes |
|---|---|---|---|---|---|
| 16 | Soak | 0 | 0 | 1395 | 10 |
| 17 | Ramp | −2.25 | 8.9 | 1375 | |
| 18 | Soak | 0 | 0 | 1375 | 10 |
| 19 | Ramp | −2.25 | 6.7 | 1360 | |
| 20 | Soak | 0 | 0 | 1360 | 10 |
| 21 | Ramp | −2.25 | 26.7 | 1300 | |
| 22 | Soak | 0 | 0 | 1300 | 15 |
| 23 | Ramp | −2.25 | 44.4 | 1200 | |
| 24 | Ramp | −5 | 30 | 1050 | |

During the heating period, silicon from the loaf was melted and reactively infiltrated the preform via capillary action. After cooling down, the "infiltrated" preform (i.e., the ceramic plate of the invention) was removed from vacuum furnace. The ceramic plate was sand blasted to remove excess silicon metal.

D. Post-Infiltration

The final density of the ceramic plate of the invention was 2.56 g/cc.

A variety of modifications to the embodiments described will be apparent to those skilled in the art from the disclosure provided herein. Thus, the present invention can be embodied in other specific forms without departing from the spirit or essential attributes thereof and, accordingly, reference should be made to the appended claims, rather than to the foregoing specification, as indicating the scope of the invention.

What is claimed is:

1. A method of making ceramic plates, the method comprising the steps of:
    mixing a slurry comprising a filler material, a carbon source and water;
    casting the slurry to make a wet preform;
    drying the wet preform to make a substantially dry preform;
    providing a silicon loaf having a solid form and adequate height, width and length for supporting one or more substantially dry preforms;
    placing the substantially dry preform on top of the silicon loaf inside of an infiltration furnace; and
    heating the substantially dry preform and loaf to melt silicon within the loaf and infiltrate the substantially dry perform;
    wherein the step of providing the silicon loaf comprises the steps of:
    mixing a loaf batch comprising a major proportion of silicon, a minor proportion of one or more bonding agents and water;
    placing the loaf batch into a mold; and
    drying the loaf batch to form a loaf.

2. The method of claim 1 wherein the step of mixing a loaf batch further comprises the step of adding boron carbide to the loaf batch.

3. The method of claim 1 wherein the bonding agent comprises carbon black.

4. The method of claim 1 wherein the bonding agent comprises potato starch.

5. The method of claim 1 wherein the step of mixing the loaf batch comprises dry mixing the silicon and bonding agent prior to adding the water.

6. The method of claim 1 wherein the filler material comprises boron carbide and the step of mixing the slurry comprises the step of adding two or more grades of boron carbide to the water.

7. The method of claim 6 wherein the step of mixing the slurry comprises the step of adding one or more clay components to the water prior to adding the boron carbide.

8. The method of claim 1 wherein the casting step comprises the steps of introducing the slurry into a porous mold and pressure casting the slurry to make a wet preform.

* * * * *